United States Patent [19]

Saito

[11] Patent Number: 4,938,573
[45] Date of Patent: Jul. 3, 1990

[54] OBJECTIVE LENS SYSTEM

[75] Inventor: Yoshiharu Saito, Tokyo, Japan

[73] Assignee: Olympus Optical Co., Ltd., Tokyo, Japan

[21] Appl. No.: 374,952

[22] Filed: Jul. 3, 1989

[30] Foreign Application Priority Data

Jul. 5, 1988 [JP] Japan ................... 63-167162

[51] Int. Cl.$^5$ .............................................. G02B 13/18
[52] U.S. Cl. ...................................... 350/432; 350/482
[58] Field of Search ................................. 350/432, 482

[56] References Cited

FOREIGN PATENT DOCUMENTS

61-3110  1/1986  Japan .
0003020  of 1915  United Kingdom ................ 350/482

Primary Examiner—Bruce Y. Arnold
Assistant Examiner—Rebecca D. Gass
Attorney, Agent, or Firm—Cushman, Darby & Cushman

[57] ABSTRACT

An objective lens system consisting of a single lens component, comprising at least one aspherical surface and having aberrations corrected favorably within a range up to relatively high image height.

6 Claims, 6 Drawing Sheets

OBJECTIVE LENS SYSTEM

BACKGROUND OF THE INVENTION (a) Field of the Invention:

The present invention relates to an objective lens system consisting of a single lens component and to be used in imaging optical systems having relatively high image heights such as objective lens systems for microscopes.

(b) Description of the prior art:

Objective lens systems each of which consists of a single lens component are widely used in the information recording-readout optical systems for optical disks since the objective lens systems have the simplest composition and are compact. The information recording-readout optical systems for optical disks require no correction of chromatic aberration since the systems use lasers having a single wavelength as a light source. For this reason, each of the objective lens systems used in this type of optical systems consists mostly of a single lens element. In the recent days, however, there have been developed optical systems which perform recording and readout of information by using a plural number of laser sources emitting lights of wavelengths different from one another. Accordingly, there are known objective lens systems each of which consists of a cemented doublet for use in these optical systems. For example, there is known the objective lens system disclosed by Japanese Unexamined Published patent application No. 3110/61. This objective lens system consists of a cemented doublet consisting of a negative meniscus lens element and a biconvex lens element arranged in the order from the object side (on the side of the optical disk), is so designed as to favorably correct chromatic aberration by selecting adequate Abbe's numbers for the two lens elements, and is so adopted as to correct the spherical aberration and the sine condition within a range up to a large numerical aperture by using aspherical surfaces on both the lens elements.

In the objective lens systems used in the information recording-readout optical systems, however, the aberrations are corrected only within a very narrow range in the vicinity of the optical axis. These objective lens systems are low in the offaxial performance thereof, and cannot practically be used as the objective lens systems for microscopes and the similar instruments which must form images of objects having sizes of certain degrees.

SUMMARY OF THE INVENTION

A primary object of the present invention is to provide an objective lens system consisting of a single lens component and having aberrations corrected favorably within a broad range covering the offaxial region.

The objective lens system according to the present invention consists of a cemented doublet consisting, in the order from the object side, of a lens element having a concave surface on the object side and a lens element having a convex surface on the image side, comprises aspherical surfaces arranged as the first and second surfaces respectively, and is so designed as to satisfy the following condition (1):

$$-0.2 > r_3/f > -0.8 \quad (1)$$

wherein the reference symbol $r_3$ represents radius of curvature on the image side surface of said convex lens element (the third surface) and the reference symbol f designates focal length of the objective lens system as a whole.

Further, the objective lens system according to the present invention consists of a cemented doublet consisting, in the order from the object side, of a meniscus lens element having a convex surface on the object side and a lens element having a convex surface on the object side, uses aspherical surfaces designed as at least one of the first and second surfaces, and the third surface, and is so designed as to satisfy the following condition (2):

$$r_3/f < -2 \text{ or } 0 < r_3/f \quad (2)$$

In the objective lens system according to the present invention, the locations of the aspherical surfaces and the orientations (convex or concave on the object side) of the aspherical surfaces are closely related to the radius of curvature on the third surface (radius of curvature in the vicinity of the optical axis when the third surface is designed as an aspherical surface).

When the first surface concave on the object side and the second surface convex on the object side are designed as the aspherical surfaces in the objective lens system according to the present invention, it is necessary to select a radius of curvature satisfying the condition (1) for the third lens surface so that it has relatively strong positive refractive power.

Whereas, when the third surface is designed as an aspherical surface, this surface has a radius of curvature satisfying the condition (2) so that it has relatively weak positive refractive power or negative refractive power.

The third surface is designed so as to have such weak refractive power since the objective lens system is so adapted as to correct Petzval's sum by adequately determining refractive power of the third surface and correct the residual coma by the aspherical surface.

If the upper limit of the condition (1) is exceeded, the positive refractive power of the third surface will be too strong to correct the spherical aberration and coma by using the aspherical surfaces. If the lower limit of the condition (1) is exceeded, in contrast, the refractive power of the third surface will be weak and the negative refractive power of the first surface must be weakened. When the negative refractive power of the first surface is weakened, the objective lens system will have a large positive Petzval's sum and curvature of field cannot be corrected.

If the condition (2) is not satisfied, the third surface will have strong positive refractive power and the objective lens system will have a large positive Petzval's sum, thereby making it impossible to correct curvature of field.

In case of the objective lens system satisfying the condition (1), it is desirable that the first surface is designed as an aspherical surface having such a shape as to have negative power strengthened as the surface portions are farther from the optical axis to correct the spherical aberration and coma produced by the third surface.

Further, in case of the objective lens system satisfying the condition (2) and comprising an aspherical surface designed as the third surface having positive refractive power, it is desirable to select such a shape for the aspherical surface as to have positive refractive power weakened as the surface portions are farther from the optical axis so as to correct the spherical aberration and coma produced by the first surface having strong positive refractive power. Furthermore, when the third surface is designed as an aspherical surface having negative refractive power, it is desirable to design the aspherical surface having negative refractive power strengthened as the surface portions are farther from the optical axis.

When the objective lens system according to the present invention satisfies the condition (1), it is more desirable to design it so as to satisfy the following conditions (3) and (4):

$$0.3 < \frac{\nu_2 - \nu_1}{r_2} < 6 \quad (3)$$

$$-1 < r_1/f < -0.3 \quad (4)$$

wherein the reference symbol $r_1$ represents radius of curvature on the object side surface of the lens element arranged on the object side (the first surface), the reference symbol $r_2$ designates radius of curvature on the cemented surface (the second surface), and the reference symbols $\nu_1$ and $\nu_2$ denote Abbe's numbers of the object side lens element and the image side lens element respectively.

The condition (3) is important for correction of the chromatic aberration. If the upper limit of the condition (3) is exceeded, the difference in spherical aberration between the c-line and the f-line will be too large for correction on the negative side. If the lower limit of the condition (3) is exceeded, in contrast, said difference will be too large for correction on the positive side.

The condition (4) is important for balancing the spherical aberration and coma with the curvature of field. If the lower limit of the condition (4) is exceeded, the curvature of the first surface will be weakened and the objective lens system will have a large positive Petzval's sum, thereby aggravating curvature of field too much for correction.

If the upper limit of the condition (4) is exceeded, in contrast, the first surface will have strong curvature, and produce spherical aberration and coma which cannot be corrected by designing the first surface as an aspherical surface.

When the objective lens system according to the present invention satisfies the condition (2), it is preferable to design the lens system so as to satisfy the following conditions (5), (6) and (7):

$$10 < \nu_2 - \nu_1 \quad (5)$$

$$0.1 < \frac{r_2}{f\left(1 - \frac{\nu_1}{\nu_2}\right)} < 1 \quad (6)$$

$$3 < \frac{r_1 \cdot D}{f} < 20 \quad (7)$$

wherein the reference symbol D represents paraxial distance as measured from the object surface to the first surface of the objective lens system.

The condition (5) has relation to correction of the chromatic aberration. If the condition (5) is not satisfied, the difference in paraxial chromatic aberration between the c-line and the F-line will be enlarged.

The condition (6) defines $r_2$ so as to correct the paraxial chromatic aberration and spherical aberration with good balance. The denominator used in this condition defines Abbe's number.

When the difference between $\nu_2$ and $\nu_1$ becomes large to minimize the denominator in the condition (6), it is necessary to minimize $r_2$ for correcting the paraxial chromatic aberration. When $r_2$ is minimized, spherical aberration and coma are produced. Accordingly, if the lower limit of the condition (6) is exceeded, the spherical aberration and coma will be aggravated too much for correction.

When the difference between $\nu_2$ and $\nu_1$ becomes small, it is necessary to enlarge $r_2$ for correcting the paraxial chromatic aberration. If the upper limit of the condition (6) is exceeded, $r_2$ will be enlarged, and it will be difficult to correct the spherical aberration and coma.

The condition (7) is adopted for favorably correcting the spherical aberration and coma. If the lower limit of the condition (7) is exceeded, the positive refractive power of the first surface will be too strong, and the spherical aberration and coma will be aggravated too much for correction by using the aspherical surfaces. If the upper limit of the condition (7) is exceeded, in contrast, the refractive power of the first surface will be weakened and the third surface must be designed so as to have strong positive refractive power. When the third surface is designed so as to have strong positive refractive power, however, the objective lens system will have a large positive Petzval's sum and the curvature of field will be aggravated too much for correction accordingly.

DETAILED DESCRIPTION OF THE PREFERRED EMBODIMENTS

Now, the objective lens system according to the present invention will be described more detailedly with reference to the preferred embodiments shown below in the form of numerical data:

Embodiment 1
f = 15.66, NA = 0.25

$r_0 = \infty$
  D = 9.8688
$r_1 = -10.1906$ (aspherical surface)
  $d_1 = 1.2568$    $n_1 = 1.7552$    $\nu_1 = 27.51$
$r_2 = 5.7802$ (aspherical surface)
  $d_2 = 6.0$    $n_2 = 1.697$    $\nu_2 = 48.51$
$r_3 = -6.3453$ Aspherical coefficient
$A_2^{(1)} = 0$          $A_4^{(1)} = -0.18458 \times 10^{-2}$
$P^{(1)} = 1$           $A_6^{(1)} = -0.77214 \times 10^{-4}$
                        $A_8^{(1)} = 0.11158 \times 10^{-5}$
                        $A_{10}^{(1)} = -0.10594 \times 10^{-5}$
$A_2^{(2)} = 0$          $A_4^{(2)} = -0.32737 \times 10^{-2}$
$P^{(2)} = 1$           $A_6^{(2)} = 0.90028 \times 10^{-4}$
                        $A_8^{(2)} = -0.77549 \times 10^{-5}$
                        $A_{10}^{(2)} = 0.24316 \times 10^{-6}$
$r_3/f = -0.41$          $r_1/f = -0.65$
$(\nu_+ - \nu_-)/r_2 = 3.63$ Embodiment 2
f = 29.54, NA = 0.1

$r_0 = \infty$
  D = 22.9673

-continued $r_1 = -16.6703$ (aspherical surface)
$\quad d_1 = 7.0 \quad n_1 = 1.72825 \quad \nu_1 = 28.46$
$r_2 = 63.3212$ (aspherical surface)
$\quad d_2 = 6.5 \quad n_2 = 1.60311 \quad \nu_2 = 60.70$
$r_3 = -10.2964$

| Aspherical coefficient | |
|---|---|
| $A_2^{(1)} = 0$ | $A_4^{(1)} = -0.32341 \times 10^{-3}$ |
| $P^{(1)} = 1$ | $A_6^{(1)} = -0.33521 \times 10^{-5}$ |
|  | $A_8^{(1)} = 0.24172 \times 10^{-7}$ |
|  | $A_{10}^{(1)} = -0.68773 \times 10^{-8}$ |
| $A_2^{(2)} = 0$ | $A_4^{(2)} = 0.10957 \times 10^{-3}$ |
| $P^{(2)} = 1$ | $A_6^{(2)} = 0.43432 \times 10^{-5}$ |
|  | $A_8^{(2)} = -0.86022 \times 10^{-7}$ |
|  | $A_{10}^{(2)} = 0.16480 \times 10^{-9}$ |
| $r_3/f = -0.35$ | $r_1/f = -0.56$ |
| $(\nu_+ - \nu_-)/r_2 = 0.51$ | |

Embodiment 3
$f = 29.42, \quad NA = 0.1$ $r_0 = \infty$
$\quad D = 22.5886$
$r_1 = -14.9412$ (aspherical surface)
$\quad d_1 = 7.0 \quad n_1 = 1.72825 \quad \nu_1 = 28.46$
$r_2 = 26.2697$ (aspherical surface)
$\quad d_2 = 6.5 \quad n_2 = 1.67 \quad \nu_2 = 51.62$
$r_3 = -10.9656$

| Aspherical coefficient | |
|---|---|
| $A_2^{(1)} = 0$ | $A_4^{(1)} = -0.3398 \times 10^{-3}$ |
| $P^{(1)} = 1$ | $A_6^{(1)} = -0.31613 \times 10^{-5}$ |
|  | $A_8^{(1)} = -0.30798 \times 10^{-8}$ |
|  | $A_{10}^{(1)} = -0.47855 \times 10^{-8}$ |
| $A_2^{(2)} = 0$ | $A_4^{(2)} = 0.41941 \times 10^{-4}$ |
| $P^{(2)} = 1$ | $A_6^{(2)} = 0.94997 \times 10^{-5}$ |
|  | $A_8^{(2)} = -0.22571 \times 10^{-6}$ |
|  | $A_{10}^{(2)} = 0.16367 \times 10^{-8}$ |
| $r_3/f = -0.37$ | $r_1/f = -0.51$ |
| $(\nu_+ - \nu_-)/r_2 = 0.79$ | |

Embodiment 4
$f = 30.65, \quad NA = 0.1$ $r_0 = \infty$
$\quad D = 43.59$
$r_1 = 9.8369$ (aspherical surface)
$\quad d_1 = 1.5 \quad n_1 = 1.80518 \quad \nu_1 = 25.43$
$r_2 = 5.3224$
$\quad d_2 = 3.5 \quad n_2 = 1.80440 \quad \nu_2 = 39.58$
$r_3 = 12.6751$ (aspherical surface)

| Aspherical coefficient | |
|---|---|
| $A_2^{(1)} = 0$ | $A_4^{(1)} = 0.12109 \times 10^{-3}$ |
| $P^{(1)} = 1$ | $A_6^{(1)} = -0.17802 \times 10^{-5}$ |
|  | $A_8^{(1)} = 0.13731 \times 10^{-6}$ |
|  | $A_{10}^{(1)} = -0.13955 \times 10^{-8}$ |
| $A_2^{(3)} = 0$ | $A_4^{(3)} = 0.43538 \times 10^{-3}$ |
| $P^{(3)} = 1$ | $A_6^{(3)} = -0.23639 \times 10^{-5}$ |
|  | $A_8^{(3)} = 0.59168 \times 10^{-6}$ |
|  | $A_{10}^{(3)} = -0.27452 \times 10^{-8}$ |
| $r_3/f = 0.41$ | $\nu_+ - \nu_- = 14.15$ |

$r_2/f \left(1 - \dfrac{\nu_-}{\nu_+}\right) = 0.49$ $r_1 \cdot D/f = 14$

Embodiment 5
$f = 30.73, \quad NA = 0.1$ $r_0 = \infty$
$\quad D = 43.6016$
$r_1 = 6.7881$ (aspherical surface)
$\quad d_1 = 1.5 \quad n_1 = 1.7552 \quad \nu_1 = 27.51$
$r_2 = 4.6284$
$\quad d_2 = 3.5 \quad n_2 = 1.50137 \quad \nu_2 = 56.40$
$r_3 = 13.1251$ (aspherical surface)

| Aspherical coefficient | |
|---|---|
| $A_2^{(1)} = 0$ | $A_4^{(1)} = 0.32559 \times 10^{-4}$ |
| $P^{(1)} = 1$ | $A_6^{(1)} = 0.38673 \times 10^{-5}$ |
|  | $A_8^{(1)} = -0.18117 \times 10^{-6}$ |
|  | $A_{10}^{(1)} = 0.52036 \times 10^{-8}$ |
| $A_2^{(3)} = 0$ | $A_4^{(3)} = 0.44560 \times 10^{-3}$ |

-continued

| $P^{(3)} = 1$ | $A_6^{(3)} = 0.24686 \times 10^{-4}$ |
|---|---|
|  | $A_8^{(3)} = -0.15189 \times 10^{-5}$ |
|  | $A_{10}^{(3)} = 0.66566 \times 10^{-7}$ |
| $r_3/f = 0.43$ | $\nu_+ - \nu_- = 28.89$ |

$r_2/f \left(1 - \dfrac{\nu_-}{\nu_+}\right) = 0.29$ $r_1 \cdot D/f = 9.63$

Embodiment 6
$f = 15.90, \quad NA = 0.25$ $r_0 = \infty$
$\quad D = 17.9148$
$r_1 = 7.003$ (aspherical surface)
$\quad d_1 = 2.0 \quad n_1 = 1.80518 \quad \nu_1 = 25.43$
$r_2 = 4.8532$
$\quad d_2 = 19.4412 \quad n_2 = 1.48749 \quad \nu_2 = 70.20$
$r_3 = -64.1686$ (aspherical surface)

| Aspherical coefficient | |
|---|---|
| $A_2^{(1)} = 0$ | $A_4^{(1)} = -0.15942 \times 10^{-4}$ |
| $P^{(1)} = 1$ | $A_6^{(1)} = 0.16165 \times 10^{-6}$ |
|  | $A_8^{(1)} = 0.57637 \times 10^{-8}$ |
|  | $A_{10}^{(1)} = -0.24292 \times 10^{-9}$ |
| $A_2^{(3)} = 0$ | $A_4^{(3)} = 0.42809 \times 10^{-3}$ |
| $P^{(3)} = 1$ | $A_6^{(3)} = 0.72598 \times 10^{-5}$ |
|  | $A_8^{(3)} = -0.21183 \times 10^{-7}$ |
|  | $A_{10}^{(3)} = 0.73086 \times 10^{-8}$ |
| $r_3/f = -4.04$ | $\nu_+ - \nu_- = 44.77$ |

$r_2/f \left(1 - \dfrac{\nu_-}{\nu_+}\right) = 0.48$ $r_1 \cdot D/f = 7.89$

Embodiment 7
$f = 15.73, \quad NA = 0.25$ $r_0 = \infty$
$\quad D = 19.6399$
$r_1 = 8.9272$
$\quad d_1 = 4.0 \quad n_1 = 1.80518 \quad \nu_1 = 25.43$
$r_2 = 4.9600$ (aspherical surface)
$\quad d_2 = 4.6561 \quad n_2 = 1.72916 \quad \nu_2 = 54.68$
$r_3 = 29.9712$ (aspherical surface)

| Aspherical coefficient | |
|---|---|
| $A_2^{(2)} = 0$ | $A_4^{(2)} = -0.65503 \times 10^{-3}$ |
| $P^{(2)} = 1$ | $A_6^{(2)} = 0.11932 \times 10^{-3}$ |
|  | $A_8^{(2)} = -0.77928 \times 10^{-5}$ |
|  | $A_{10}^{(2)} = 0.14453 \times 10^{-6}$ |
| $A_2^{(3)} = 0$ | $A_4^{(3)} = 0.56296 \times 10^{-3}$ |
| $P^{(3)} = 1$ | $A_6^{(3)} = -0.16557 \times 10^{-4}$ |
|  | $A_8^{(3)} = 0.19382 \times 10^{-5}$ |
|  | $A_{10}^{(3)} = -0.4229 \times 10^{-7}$ |
| $r_3/f = 1.91$ | $\nu_+ - \nu_- = 29.25$ |

$r_2/f \left(1 - \dfrac{\nu_-}{\nu_+}\right) = 0.59$ $r \cdot D_1/f = 11.1$ wherein the reference symbols $r_1$, $r_2$ and $r_3$ represent radii of curvature on the surfaces of the respective lens elements, the reference symbols $d_1$ and $d_2$ designate thicknesses of the respective lens elements, the reference symbols $n_1$ and $n_2$ denote refractive indices of the respective lens elements, and the reference symbols $\nu_1$ and $\nu_2$ represent Abbe's numbers of the respective lens elements. In addition, the reference symbols $r_0$ represents the surface of the cover glass located on the side of the lens system and the reference symbol D designates distance as measured from the object surface to the first surface of the lens system.

When the optical axis is taken as the x axis, and the straight line passing through the vertex of an aspherical surface and perpendicular to the optical axis is taken as the y axis, each of the aspherical surfaces used in the Embodiments is expressed by the following formula:

$$x = \frac{y^2/R}{1 + \sqrt{1 - P(y/R)^2}} + \sum_{i=1} A_{2i} y^{2i}$$

wherein the reference symbol R represents radius of curvature at the vertex of the aspherical surface, the reference symbol P designates the conic constant and the reference symbol $A_{2i}$ denotes the aspherical surface coefficient of the 2i'th order. The aspherical surface coefficients used in the Embodiments are listed in the numerical data of the Embodiments.

In each of the Embodiments 1 through 3, the first surface concave on the object side and the second surface convex on the object side are designed as aspherical surfaces. Accordingly, all the Embodiments 1 through 3 are so designed as to satisfy the condition (1). Further, all of these Embodiments satisfy the conditions (3) and (4).

Figure 1:
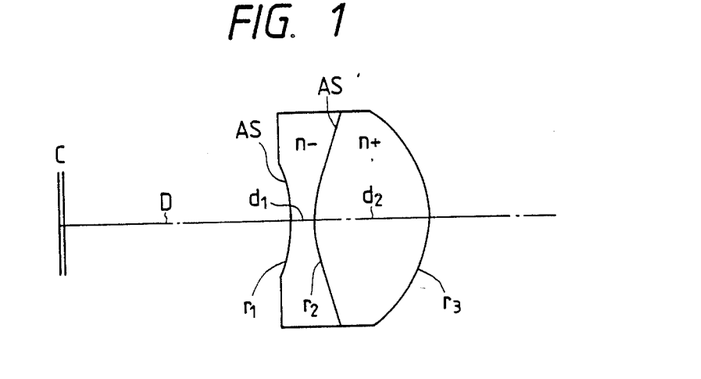
FIG. 1 through FIG. 7 show sectional views illustrating compositions of Embodiments 1 through 7 of the objective lens system according to the present invention.
Figure 2:
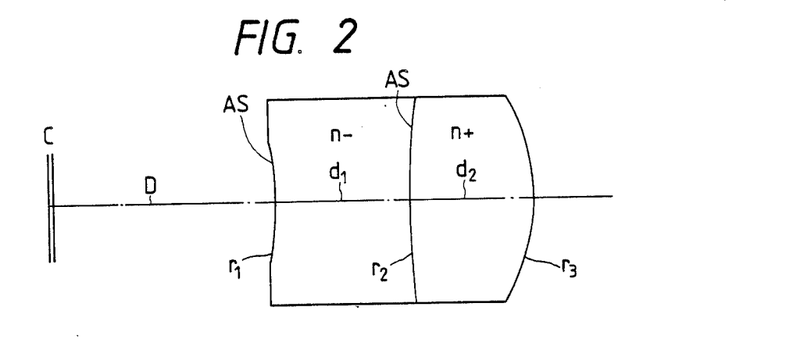
Figure 3:
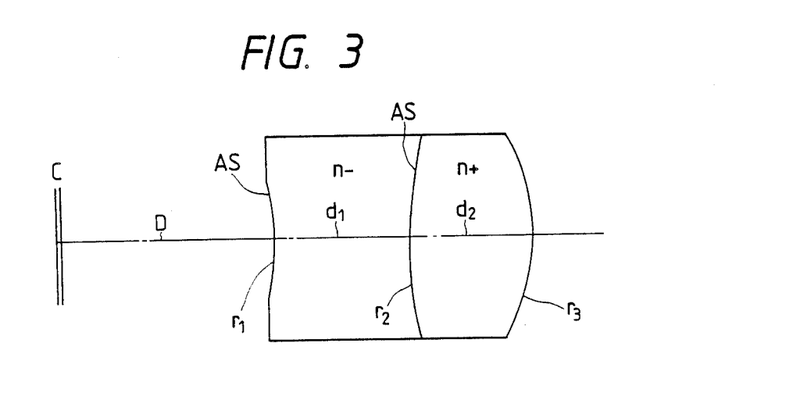
Figure 4:
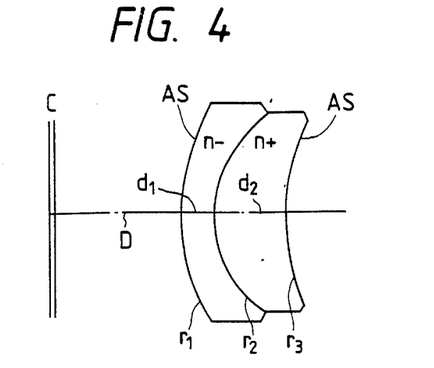
Figure 5:
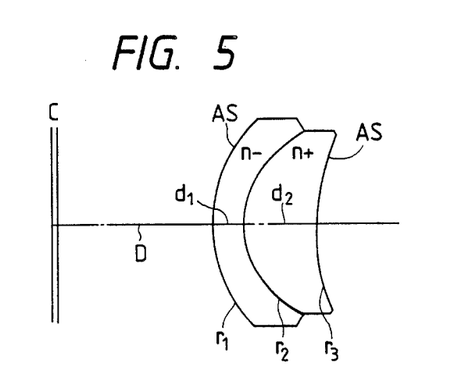
Figure 6:
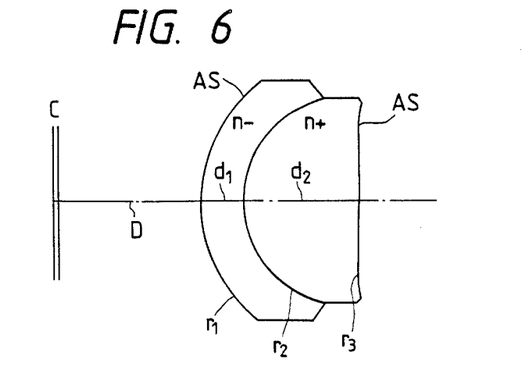
Figure 7:
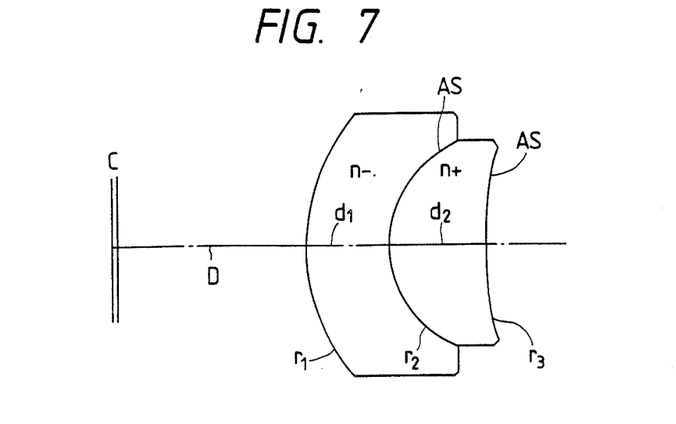
Figure 8:
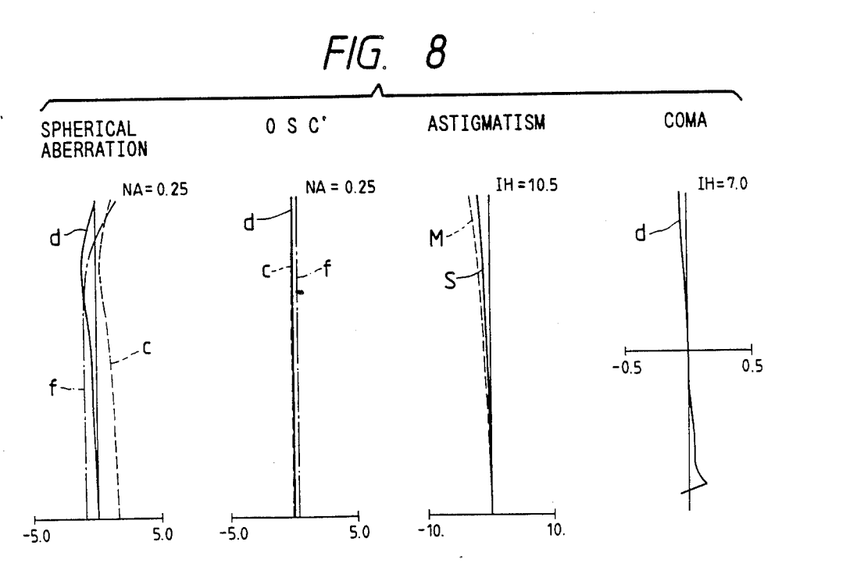
FIG. 8 through FIG. 14 show curves illustrating aberration characteristics of the Embodiments 1 through 7 of the present invention.
Figure 9:
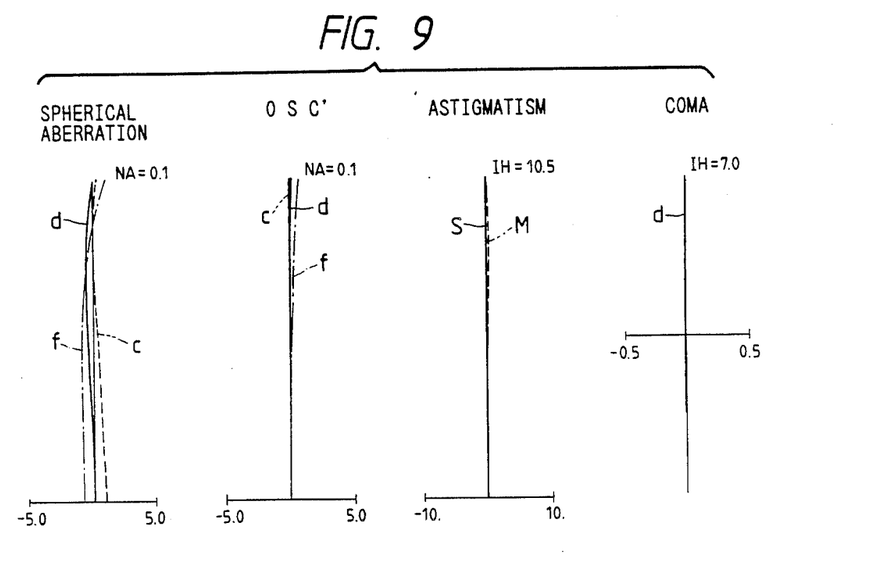
Figure 10:
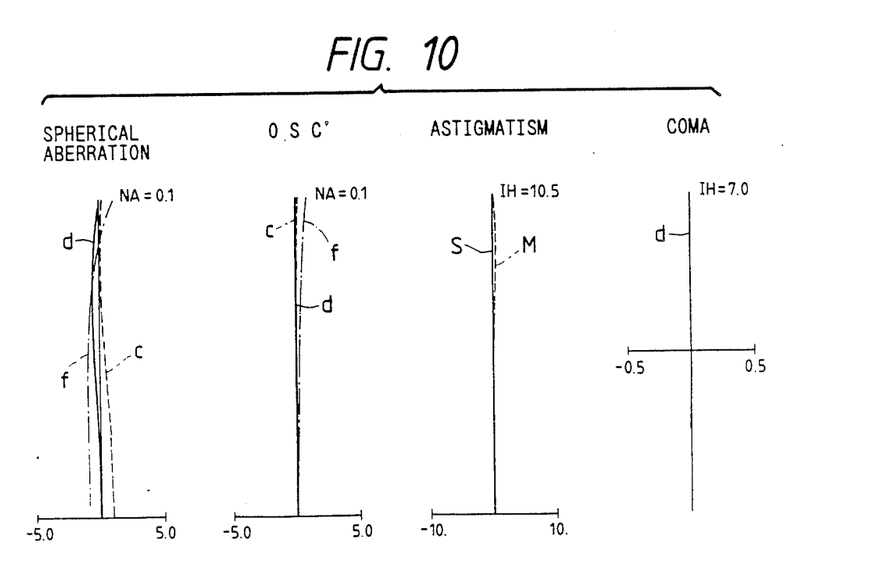
Figure 11:
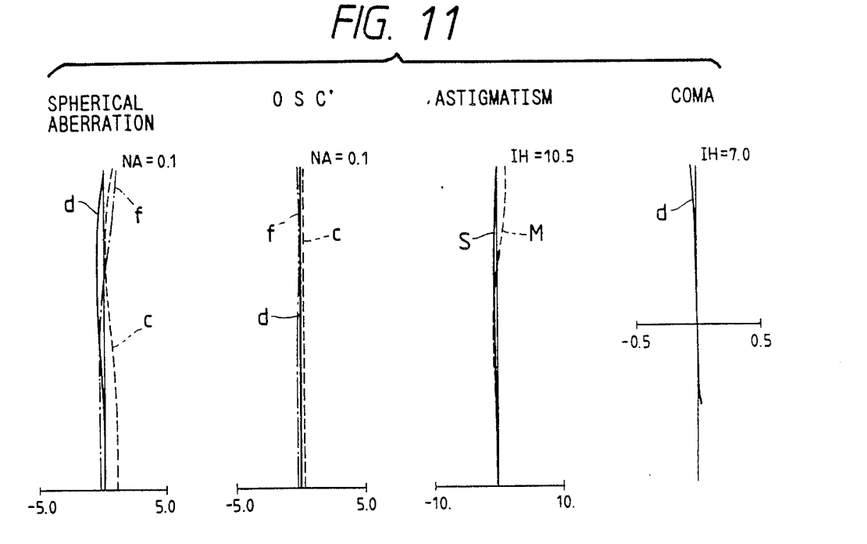
Figure 12:
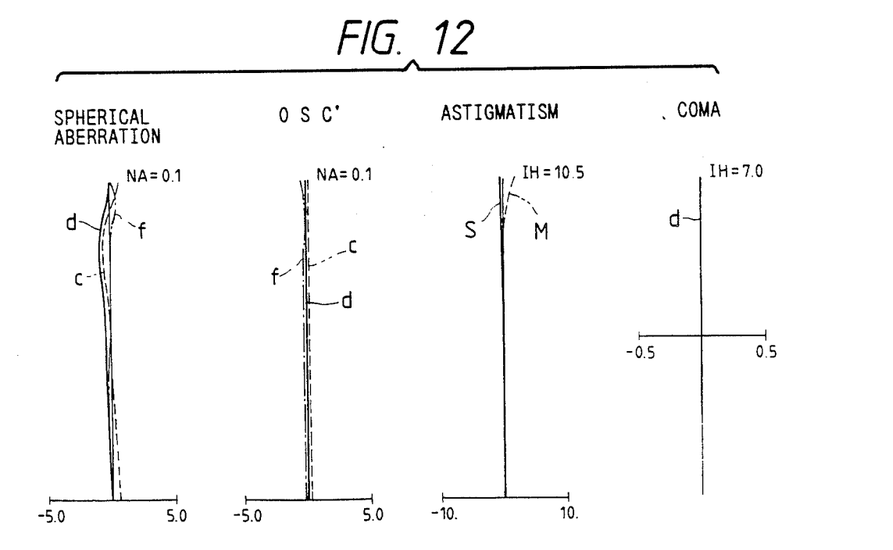
Figure 13:
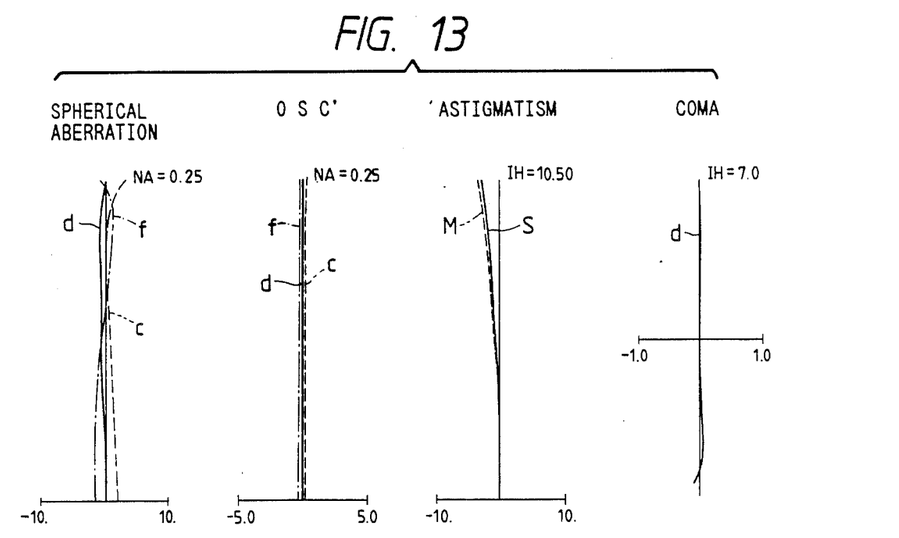
Figure 14:
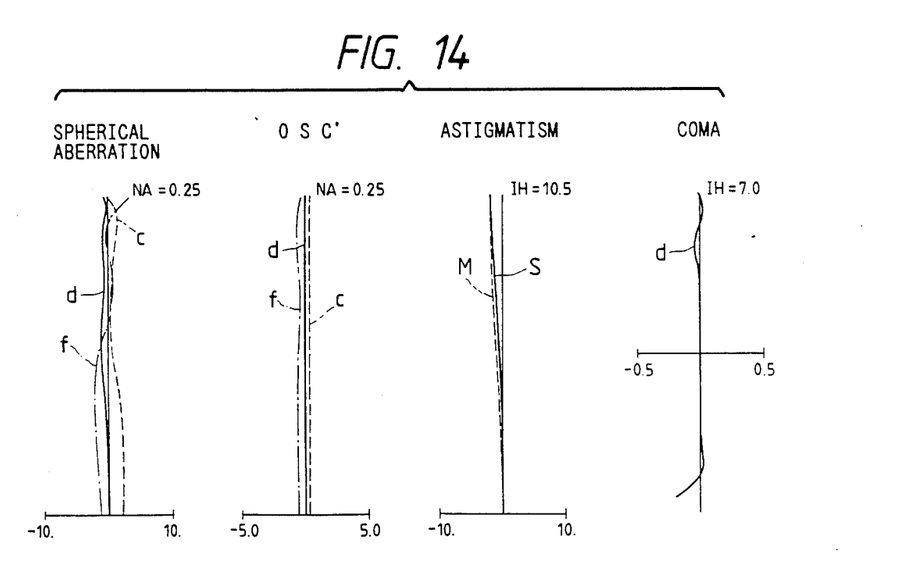

The Embodiments 4 through 7 have the compositions illustrated in FIG. 4 through 7 respectively. Each of these Embodiments satisfies the condition (2). All of these Embodiments further satisfy the conditions (5) through (7).

Out of these Embodiments, the Embodiments 4 through 6 comprise the first surface designed as an aspherical surface, whereas the Embodiment 7 adopts an aspherical surface as the second surface.

In addition, an object is located at a distance of $-0.17$ as measured from the surface $r_0$ of the cover glass in each of the Embodiments 1 through 7.

As is understood from the foregoing description, the objective lens system according to the present invention consists of a single lens component and has aberrations corrected favorably within a range up to relatively high image height.

We claim:

1. An objective lens system consisting of a single lens component of a cemented doublet, comprising a first surface concave on the object side, a second surface convex on the object side and a third surface convex on the image side arranged in the order from the object side, said first surface and said second surface being designed as aspherical surfaces, and so designed as to satisfy the following condition (1):

$$-0.2 > r_3/f > -0.8 \tag{1}$$

wherein the reference symbol $r_3$ represents radius of curvature on the third surface and the reference symbol f designates focal length of the objective lens system as a whole.

2. An objective lens system according to claim 1 further satisfying the following conditions (3) and (4):

$$0.3 < \frac{v_2 - v_1}{r_2} < 6 \tag{3}$$

$$-1 < r_1/f < -0.3 \tag{4}$$

wherein the reference symbols $r_1$ and $r_2$ represent radii of curvature on the first surface and the second surface respectively, and the reference symbols $v_1$ and $v_2$ designates Abbe's numbers of the object side lens element and the image side lens element respectively of the cemented doublet.

3. An objective lens system consisting of a single lens component of a cemented doublet, comprising a first surface convex on the object side, a second surface convex on the object side and a third surface designed as an aspherical surface, and so designed as to satisfy the following condition (2):

$$\text{one of } r_3/f < -2 \text{ and } 0 < r_3/f \tag{2}$$

wherein the reference symbol $r_3$ radius of curvature at the vertex of the third surface and the reference symbol f designates focal length of the objective lens system as a whole.

4. An objective lens system according to claim 3 further satisfying the following conditions (5), (6) and (7):

$$10 < v_2 - v_1 \tag{5}$$

$$0.1 < \frac{r_2}{f\left(1 - \frac{v_1}{v_2}\right)} < 1 \tag{6}$$

$$3 < \frac{r_1 \cdot D}{f} < 20 \tag{7}$$

wherein the reference symbols $r_1$ and $r_2$ represent radii of curvature on the first surface and the second surface respectively (radius of curvature at the vertex when the surface is designed as an aspherical surface), and the reference symbol D designates distance as measured from the object surface to the first surface.

5. An objective lens system according to claim 4 wherein the first surface is designed as an aspherical surface.

6. An objective lens system according to claim 4 wherein the second surface is designed as an aspherical surface.

* * * * *